United States Patent
Schürg

(10) Patent No.: US 7,744,158 B2
(45) Date of Patent: Jun. 29, 2010

(54) HEAD REST FOR A SEAT, ESPECIALLY AN AIR PASSENGER SEAT

(75) Inventor: Hartmut Schürg, Schwäbisch Hall (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 640 days.

(21) Appl. No.: 11/658,736

(22) PCT Filed: Oct. 11, 2005

(86) PCT No.: PCT/EP2005/010912
§ 371 (c)(1),
(2), (4) Date: Jan. 29, 2007

(87) PCT Pub. No.: WO2006/061057
PCT Pub. Date: Jun. 15, 2006

(65) Prior Publication Data
US 2009/0189430 A1    Jul. 30, 2009

(30) Foreign Application Priority Data
Dec. 11, 2004    (DE) ................. 10 2004 059 864

(51) Int. Cl.
*B60N 2/48* (2006.01)
(52) U.S. Cl. ...................... 297/391; 297/397
(58) Field of Classification Search ................ 297/391, 297/397, 398, 399, 400, 401, 402, 452.27, 297/220
See application file for complete search history.

(56) References Cited

U.S. PATENT DOCUMENTS

| | | | | |
|---|---|---|---|---|
| 2,983,310 A * | 5/1961 | Warlick et al. | ............... | 297/399 |
| 3,226,159 A * | 12/1965 | Binding | ...................... | 297/397 |
| 3,645,556 A * | 2/1972 | Kobori | .................... | 297/397 X |
| 3,865,450 A * | 2/1975 | Bruenig | ....................... | 297/397 |
| 4,265,484 A * | 5/1981 | Stalter | ................ | 297/452.27 X |
| 4,773,707 A * | 9/1988 | Vadala | ......................... | 297/391 |
| 4,797,934 A * | 1/1989 | Hufnagel | ................. | 297/391 X |
| 4,997,234 A * | 3/1991 | Royle et al. | ............. | 297/397 X |
| 5,503,456 A * | 4/1996 | Rossini | ....................... | 297/397 |
| 6,123,389 A * | 9/2000 | O'Connor et al. | ........... | 297/397 |
| 6,305,749 B1 * | 10/2001 | O'Connor et al. | ........... | 297/397 |
| 6,601,804 B2 * | 8/2003 | Bisch | ...................... | 297/397 X |
| 6,641,220 B2 * | 11/2003 | Clegg | .......................... | 297/397 |
| 6,648,416 B2 * | 11/2003 | O'Connor et al. | ........... | 297/397 |
| 6,669,143 B1 | 12/2003 | Johnson | | |
| 6,893,094 B2 * | 5/2005 | O'Connor | .................... | 297/397 |

(Continued)

FOREIGN PATENT DOCUMENTS

DE    1 011 743    7/1957

(Continued)

*Primary Examiner*—Rodney B White
(74) *Attorney, Agent, or Firm*—Posz Law Group, PLC

(57) ABSTRACT

A head rest for a seat, especially an air passenger seat, includes a carrier structure that can be applied to the back rest part of the seat and includes a supporting structure for supporting the head of the seat passenger. The supporting structure has individual strand-type or strip-type supporting parts (13) with a pre-defined flexibility. A second supporting structure in the form of padding is arranged on the first supporting The padding has a flexibility that is different from that of the supporting parts (13) of the first supporting structure, and at least the supporting structures are provided with an outer coating structure.

11 Claims, 2 Drawing Sheets

U.S. PATENT DOCUMENTS

| | | | |
|---|---|---|---|
| 7,093,903 B2 * | 8/2006 | O'Connor et al. | 297/397 |
| 7,234,771 B2 * | 6/2007 | Nakhla | 297/397 X |
| 7,547,071 B2 * | 6/2009 | Huffman | 297/397 |
| 7,556,313 B2 * | 7/2009 | Browne et al. | 297/391 X |
| 2004/0007910 A1 | 1/2004 | Skelly | |
| 2005/0127735 A1 * | 6/2005 | Munsch | 297/391 |
| 2007/0188004 A1 * | 8/2007 | Browne et al. | 297/391 |

FOREIGN PATENT DOCUMENTS

| | | | |
|---|---|---|---|
| DE | 23 30 463 | 1/1975 | |
| DE | 27 14 796 | 10/1978 | |
| DE | 199 55 046 | 5/2001 | |
| DE | 102 09 187 | 8/2003 | |
| GB | 2155775 A * | 10/1985 | 297/397 |

* cited by examiner

HEAD REST FOR A SEAT, ESPECIALLY AN AIR PASSENGER SEAT

The invention relates to a head rest for a seat, especially an air passenger seat, with a load-bearing structure that can be attached to the seatback part of the seat and that has a support structure provided for the support of the head of the seat occupant, and said support structure is made up of individual strand-like or band-like support parts of predetermined flexibility.

A headrest of this type, which is provided for use in a motor vehicle seat, is known from the document DE 27 14 796 A 1. If headrests of this type, as is the case in the known headrests indicated in the foregoing, are provided for use in motor vehicles for individual transport, essentially two requirements are to be imposed on the headrests in question. The first requirement is the protective function for the head of the driver in the case of danger. The second requirement is for the headrest to impair the view of the driver toward the rear as little as possible. With respect to these requirements, in the case of the known headrests indicated in the foregoing, the support parts that make up the support structure are made up of thin strands that are produced such that they form a net that is suspended on the load-bearing structure.

The configuration of the support structure in the form of a net that enables a certain measure of unobstructed view impedes the driver's range of vision that is aspired to only to a small extent. Such a net, however, has insufficient strength to offer adequate protection for the head and/or cervical vertebrae of the seat occupant in the case of a crash, such that the known headrests, even though the visibility toward the rear is less impaired, are not suitable because of the protective function that is inadequate for use in motor vehicles.

The known headrest meets to a still smaller extent the additional requirements that are to be imposed on headrests for passenger seats for general means of transport, for example for buses, ferries, or, in particular, aircraft. Headrests for such purposes must meet not only the protective function that is necessary in the case of a crash but even primarily make up a comfort element of the seat that increases the ease of the seat occupant. With use in motor vehicles, the headrest does not need to make available any support surface that would offer a comfortable support suitable for a resting or sleeping position to the driver while supporting the head over an extended period. In the case of headrests for passenger seats, in particular aircraft passenger seats, however, in view of the possibly long travel period in question, the head of the seat occupant is to be supported comfortably when resting on the headrest, in particular when the seat occupant assumes a resting or sleeping position.

Correspondingly, the object of the invention to make available a headrest for a seat, in particular an aircraft passenger seat, which makes possible an optimum support of the head of the seat occupant that is supported on the headrest.

According to the invention, this object is achieved by a headrest that has the features of claim 1 in its entirety.

In that, as specified in the characterizing part of claim 1, another support structure with differently selected flexibility, however, is arranged on the support structure that is located on the load-bearing structure and these two structures, moreover, are provided with an outside covering structure, a resulting prestressing of such a type is produced for the support surface formed on the covering structure for the head of the seat occupant that consists of the individual flexibilities of the structural design that is configured in three stages, such that the force of application exerted in the support of the head of the seat occupant results in an enlargement of the support surface. This results in different reclined resting or sleeping positions for an optimum support of the head of the seat occupant, such that maximum seating comfort is achieved.

In preferred embodiments, the load-bearing structure has a middle part that extends transverse to the longitudinal direction of the seat that can be anchored to the seatback part, and a side part that protrudes forward in each case on its two lateral ends, and support parts of the first support structure overlap both the middle part and the side parts at least in partial areas. In such a configuration, in which the support area is limited laterally by protruding "ears," an especially comfortable support is produced for the seat occupant, in particular in the side-sleeping position, in which the lateral head area is attached to the transition area between the middle part and the ear-like side part, by enlarging the support surface, the head of the sleeping seat occupant being kept from slipping downward.

The support parts of the first support structure are preferably band-like, the bands, partially overlapping one another and extending in different directions, being provided at least in the areas of the middle part and the side parts of the load-bearing structure that are provided for the support of the head.

The arrangement is preferably created so that at least one band-like support part that goes through from side part to side part along the middle part is present.

In advantageous embodiments, the additional support structure that is found on the first support structure is made up of at least one such cushion part, which covers the first support structure at least in the area that is used for the support of the head and that is directly adjacent to the first support structure.

The covering structure is preferably also directly adjacent to the cushion part that makes up another support structure.

Below, the invention will be explained in detail based on an embodiment that is depicted in the drawing. Here:

Figure 1:
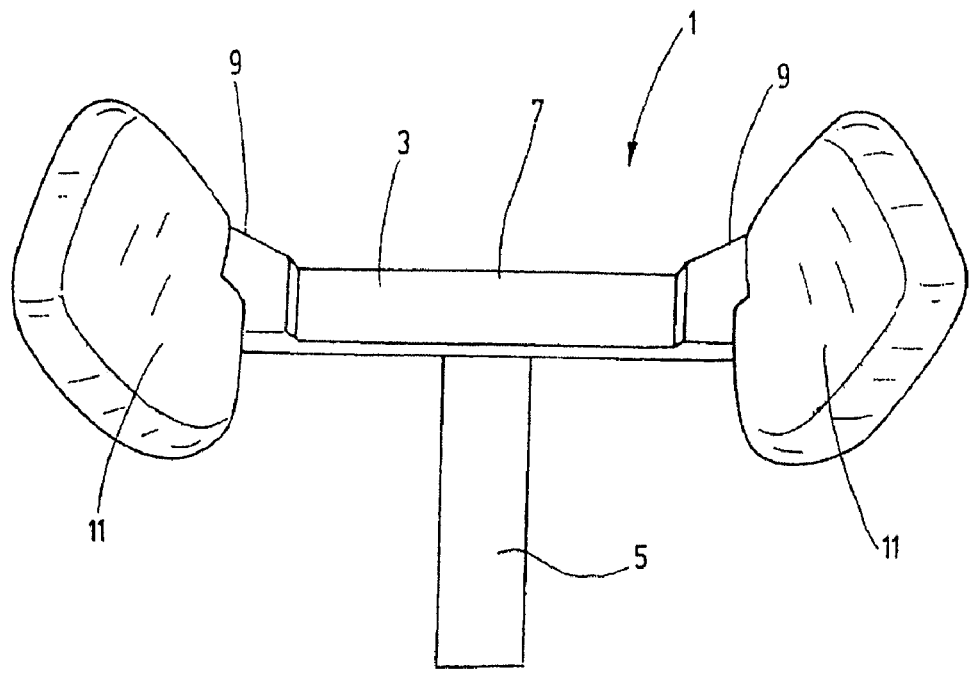
FIG. 1 shows a perspective front view only of the load-bearing structure of an embodiment of the head support according to the invention with ear-like cushion elements protruding on the side parts of the load-bearing structure, the load-bearing structure being drawn without corresponding support structures and without a covering structure.
Figure 3:
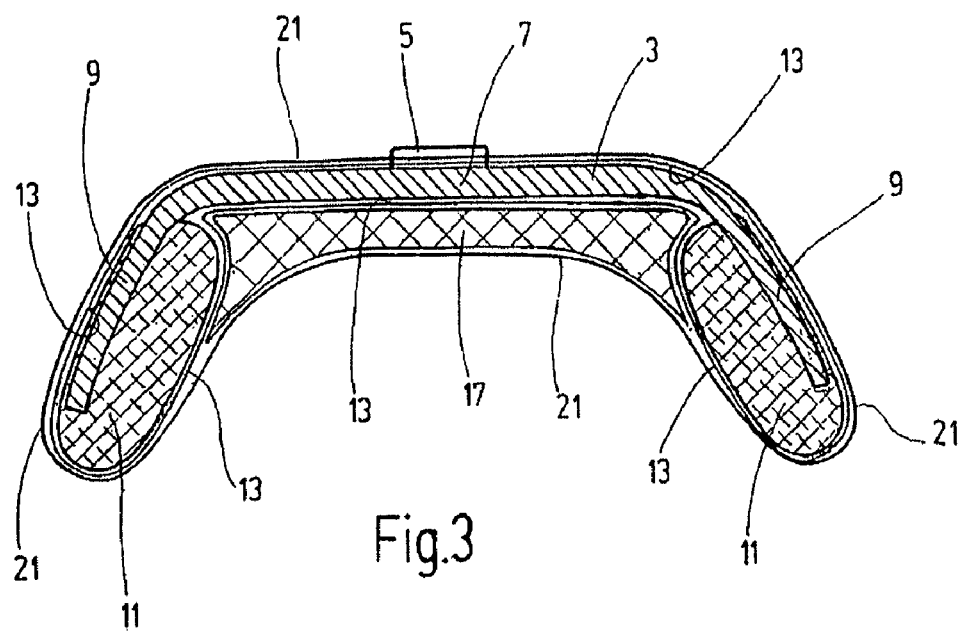
FIG. 3 shows a diagrammatically simplified horizontal section of the embodiment on a scale that is reduced in size compared to FIGS. 1 and 2.

The configuration of the load-carrying structure that is designated as a whole as 1 of the embodiment of the headrest to be described here, as is to be seen most clearly in FIGS. 1 and 3, has a metal cross member 3, which, relative to the normal installation position of the corresponding seat, can be anchored horizontally and extending parallel to the main plane of the seatback of this corresponding seat to the structure of the seatback by means of a support bar 5, which extends downward from the central area of the cross member 3. As an alternative, instead of the single support bar 5 arranged in the middle, two support bars (not shown) that are attached off-center to the cross member 3 could be provided. The two lateral end areas of the cross member 3, which are attached on both sides to its middle part 7, form side parts 9 that extend forward, spreading apart, in one piece with the middle part 7. As is to be seen in particular in FIGS. 1 and 3, the side parts 9 carry cushion elements 11 that are rounded like ears, in which these are foam elements foamed onto the side parts 9 in the embodiment shown.

Figure 2:
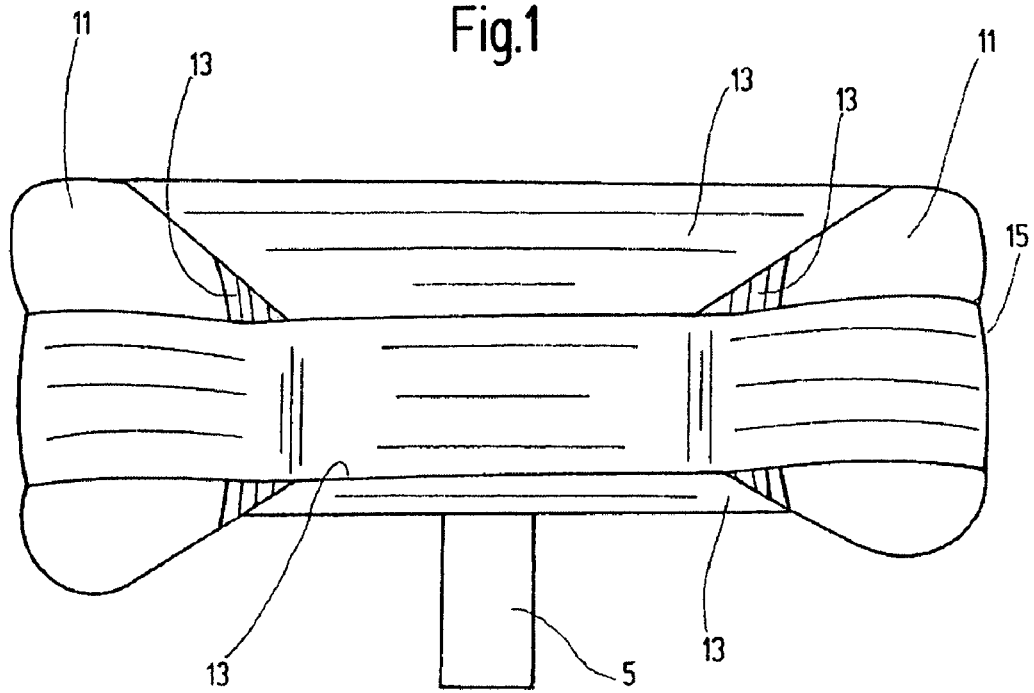
FIG. 2 shows a perspective front view of the load-bearing structure, drawn on a scale similar to FIG. 1, but provided with a first support structure that consists of band-like support parts.

FIGS. 2 and 3 illustrate the first support structure that is provided on the load-bearing structure 1. Their support parts are made up of bands 13. As can be seen from FIGS. 2 and 3, the load-bearing structure 1 is wound with these bands 13, the bands 13 being extended with different band directions on the front side and the rear side of the load-bearing structure 1, adjacent to the latter. As can be seen most clearly from FIG. 2, a majority of the lateral cushion element 11 is also wound, a band 13 extending through cushion element 11 to cushion element 11 and being guided backward over its lateral outside edges in each case with a certain amount of prestressing, which manifests itself as a slight indentation 15 in the cushion element 11 in question. The bands 13 are fixed in each case to the facing parts of the load-bearing structure 1 and the cushion element 11 at the rear side thereof.

FIG. 3 shows that another support structure in the form of a cushion part 17 is arranged on the first support structure that is made up of the bands 13. In this example, the cushion part 17 is formed by an insertion of foam, which extends, attached to the bands 13, almost over the entire area of the support of the head 19 (FIG. 4) of a seat occupant.

Figure 4:
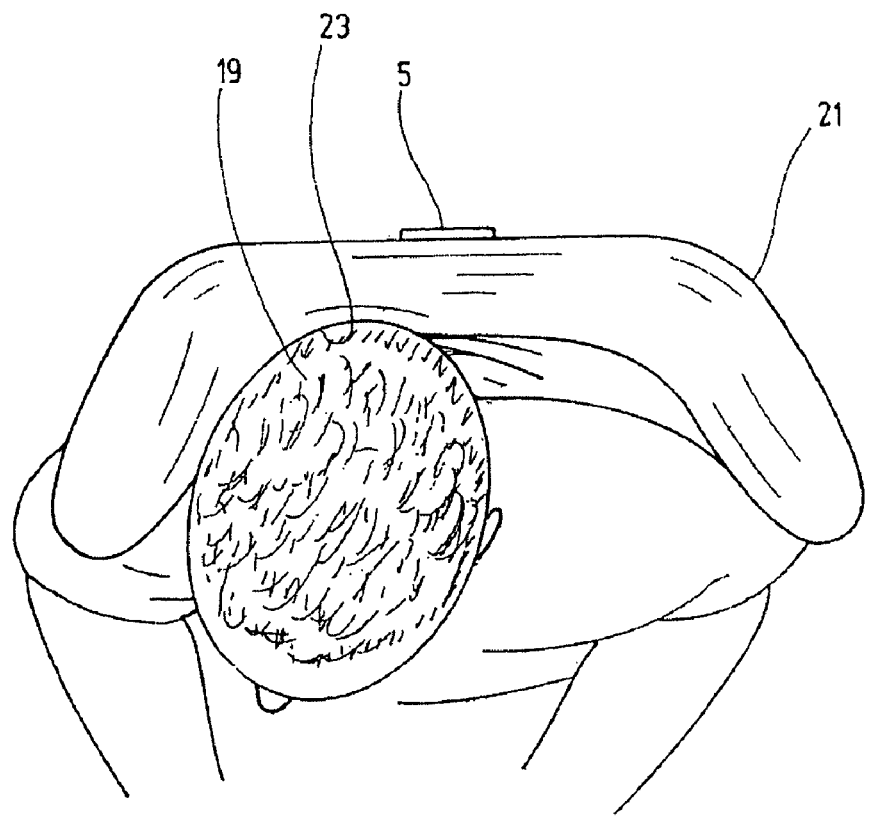
FIG. 4 shows an elevational view of the embodiment that is drawn greatly diagrammatically simplified, the support of the head of a seat occupant in a side-sleeping position being illustrated.

As can be seen from FIGS. 3 and 4, first and second support structures, i.e., bands 13 and cushion parts 17 are covered by an outer covering structure 21, which forms a complete wrapping of the entire head support element, both on its front side and on its rear side, only the support bar 5 not being completely wrapped as an anchoring part.

As FIG. 4 illustrates, the multistage structural design of the headrest that consists of the first support structure that consists of bands 13 with predetermined flexibility and the second support structure thus located in the form of a cushion part 17 that has a different flexibility, however, in connection with another covering structure 21 leads to a resulting overall flexibility, in which the force with which the head 19 of the seat occupant is applied against the point where it is placed results in an enlargement of the support surface 23, see FIG. 4.

In the case of the covering structure 21, this may be a textile upholstery fabric with a surface structure, which is selected such that a comfortable cushion is formed for the head 19 of the seat occupant, but there is a certain amount of frictional adhesion to the support surface 23, such that in the case of a seat occupant that is in a resting or sleeping position, the head 19 is kept from slipping downward.

Since, as indicated in the foregoing, the bands 13 on the load-bearing structure 1 are provided not only on the front side in the area of the support of the head 19 of the seat occupant, but rather the load-bearing structure 1 is also wound around with bands 13 on the rear side, the bands 13 contribute to an increase of the strength of the entire structure. Instead of a metal material, a different, non-metallic material could therefore also be used for the cross member 3 with the side parts 9, by which a saving of weight would be achieved.

The invention claimed is:

1. A head rest of a seat, especially of an air passenger seat, comprising:
    a load-bearing structure that can be attached to a seatback part of the seat;
    a first support structure for support of the head of a seat occupant, wherein the first support structure is made up of individual band-like support parts of a predetermined flexibility;
    a second support structure designed as a cushion part arranged on the first support structure, wherein the second support structure has a differently selected flexibility compared to the first support structure, and
    an outside covering structure that at least partially covers both the first support structure and the second support structure.

2. The headrest according to claim 1, wherein the load-bearing structure has a middle part that extends laterally, can be anchored to the seatback part, and includes two lateral endings and a side part at each of the lateral endings that protrudes in a forward direction, and wherein the band-like support parts of the first support structure overlap both the middle part and the side parts at least in partial areas.

3. The headrest according to claim 2, wherein the middle part of the load-bearing structure is made up of a cross member that extends laterally relative to a balance of the load bearing structure, and a support bar extends from a central area of the cross member, wherein the support bar is adapted to extend towards and connect with a seatback part of the seat, and wherein the side parts, which are located on both lateral ends of the cross member, extend forward while spreading slightly apart.

4. The headrest according to claim 2, wherein the band-like support parts of the first support structure, partially overlap one another and extend in different directions, and wherein the band-like support parts are provided at least in the areas of the middle part and the side parts of the load-bearing structure that are provided for the support of the head.

5. The headrest according to claim 4, wherein at least one band-like support part, of the first support structure is continuous from one side part to the other side part along the middle part of the load bearing structure.

6. The headrest according to claim 5, wherein at least a cushion element that makes up a support surface for one of the band-like support parts is provided on each of the side parts of the load bearing structure.

7. The headrest according to claim 6, wherein at a location of a supporting area, at which the head of the seat occupant is supported, a mechanical load from the head of the seat occupant is applied to a multi-layer arrangement that consists of the outside covering structure, one of the support parts of the first support structure and one of the cushion elements.

8. The headrest according to claim 1, wherein the second support structure that is arranged on the first support structure is made up of at least one cushion part, which covers the first support structure at least in an area that is designed for the support of the head and that is directly adjacent to the first support structure.

9. The headrest according to claim 8, wherein the outside covering structure is directly adjacent to the at least one cushion part that makes up the second support structure.

10. The headrest according to claim 1, wherein at a location of a supporting area, at which the head of the seat occupant is supported, a mechanical load from the head of the seat occupant is applied to a multi-layer arrangement that consists of the outside covering structure, the cushion part and one of the support parts of the first support structure.

11. The headrest according to claim 1, wherein the outside covering structure provides a holding-force by frictional adhesion to resist sliding of the head of a sleeping seat occupant.

* * * * *